(12) United States Patent
Finkler

(10) Patent No.: US 7,475,198 B2
(45) Date of Patent: Jan. 6, 2009

(54) ASYNCHRONOUS SYMMETRIC MULTIPROCESSING

(75) Inventor: Ulrich A. Finkler, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/873,464

(22) Filed: Oct. 17, 2007

(65) Prior Publication Data
US 2008/0133841 A1 Jun. 5, 2008

Related U.S. Application Data

(62) Division of application No. 11/103,156, filed on Apr. 11, 2005, now Pat. No. 7,318,126.

(51) Int. Cl.
*G06F 13/14* (2006.01)
(52) U.S. Cl. ............ 711/153; 711/148; 711/150; 709/225; 709/249
(58) Field of Classification Search ............ None
See application file for complete search history.

(56) References Cited

U.S. PATENT DOCUMENTS

2002/0016892 A1* 2/2002 Zalewski et al. ............ 711/153
2003/0146074 A1* 8/2003 Cummings et al. .......... 200/1 R
2004/0103218 A1* 5/2004 Blumrich et al. ............ 709/249
2004/0151209 A1* 8/2004 Cummings et al. .......... 370/503

* cited by examiner

*Primary Examiner*—Than Nguyen
(74) *Attorney, Agent, or Firm*—Keusey, Tutunjian & Bitetto, P.C.; Brian P. Verminski, Esq.

(57) ABSTRACT

An apparatus for serializing concurrent requests to multiple processors includes a signal merging tree structure and a traversal mechanism. The tree structure has a root node and leaf nodes for connecting a data consumer to the root. The tree structure serializes concurrent requests in the presence of race conditions, and connects each request producer from among the processors to a respective leaf node. The mechanism enables a producer to transmit a signal from a corresponding leaf node to the consumer at the root node by setting all nodes on a path from the leaf node to the root node to a Boolean true. The mechanism enables the consumer to trace signal submissions of the producers such that submission traversals by the producers and trace traversals by the consumer can be concurrently performed to allow data races between signal submissions by producers and between signal submissions by producers and the consumer.

20 Claims, 13 Drawing Sheets

ASYNCHRONOUS SYMMETRIC MULTIPROCESSING

CROSS-REFERENCE TO RELATED APPLICATIONS

This application is a divisional of allowed U.S. patent Ser. No. 11/103,156, filed Apr. 11, 2005, now U.S. Pat. No. 7,318, 126, which is incorporated by reference herein in its entirety.

BACKGROUND

1. Technical Field

The invention generally relates to computers and, more particularly, to symmetric multiprocessing (SMP).

2. Description of the Related Art

The shared memory concept became the architecture of choice for general-purpose multi-processor machines over the last decade. One of the reasons was the simplicity of the programming model. On one side, the number of processors in symmetric multiprocessing (SMP) is steadily growing and, on the other side, smaller SMP configurations are already common as workstations and about to enter the domain of personal computers.

A description will now be given regarding scalability limitations in current SMPs.

There are different types of limitations to scalability in parallel shared memory programs. Intrinsic limitations are a property of the algorithm and result from data dependencies. The intrinsic limitations of an algorithm define the amount of coordination between parallel tasks and, thus, an upper bound for the amount of parallelism that can be achieved. A second set of limitations results from the system executing the parallel program, and these can be classified into explicit and implicit scalability limitations. The impact of explicit and implicit limitations depends on the system executing the program, not on the algorithm.

Explicit scalability limitations are a result of the time required by a coordinating operation in the program. An example is the time between the release of a lock (also called mutex) by one thread and the successful acquisition of another thread that was waiting for this lock.

Implicit scalability limitations are the result of coordination operations between parallel tasks that are not stated in the program, but which are part of the architecture of the system. One of the important implicit scalability limitations is the maintenance of cache coherence in an SMP system.

Amdahl's law expresses how serialization of even a small fraction of a computation impacts scalability:

$$Speedup = \frac{1}{\frac{Fraction_{enhanced}}{Speedup_{enhanced}} + (1 - Fraction_{enhanced})}$$

Coordination overhead contributes often directly to the unenhanced fraction.

For an algorithm which partitions the workload into 2% that is serial, and 98% that is perfectly parallelized, the intrinsic limitations allow a speedup of at most 50. The serial workload may include the task of partitioning the data into packages that can be processed independently. Here the total compute cost required by the serialized version of the algorithm is presumed to be identical to the total compute cost of the parallel algorithm, i.e. coordinating operations such as thread creation or lock acquisitions are presumed to be instantaneous.

The explicit scalability limitations add another contribution, e.g., the creation of threads is not instantaneous. If it is presumed that the scheduling of threads involving a conditional variable and a lock requires 1% of the total cost of the algorithm, then the speedup is limited to 33.3. For example, on an IBM S80 (24 processors, 450 MHz each), the lock transfer between two processors through the load reserve—store conditional primitive requires roughly between 500 and 1000 clock cycles, depending on contention. This cost was determined through a micro benchmark (in assembler) and also within the context of an application using the pthread library. For the experiments, rescheduling of "spinning" threads was disabled to minimize the impact of contact switches. The program ran in the 1:1 thread model (i.e., each thread has its own kernel thread). The compute cost of explicit coordination operations increases the total compute cost of the parallel algorithm compared to the serial algorithm, while potentially reducing the elapsed time due to using multiple processors. In our example, the total compute cost of the parallel program is 101% of the serial execution.

Implicit scalability limitations further increase the total compute cost without being visible in the program. Implicit scalability limitations include, for example, the overhead of coherence traffic. If it is presumed that implicit scalability limitations add another 1% of serial execution, the speedup for our example is already limited to 25.

FIGS. 1A through 1C are plots illustrating results (runtimes) 100 110, and 120, respectively, for a benchmark derived from a practical task, VLSI net building. Net building finds electrically connected components in a very large-scale integration (VLSI) layout. A VLSI design includes multiple so-called cells in which nets are built independently. Additionally, cells interact with each other. The benchmark neglects these interactions to create independent tasks so that parallelism is not influenced by data dependencies of the problem; this minimizes intrinsic scalability limitations. Thus, this benchmark has no significant intrinsic and no significant explicit scalability limitations.

FIG. 1A illustrates the runtimes 100 using 1, 8, 12 and 24 POSIX-threads for different memory managers which all stop to improve for more than 8 processors. The curve 110 is the result using 1, 8, 12 and 24 processes (using fork), and the curve 120 shows the theoretical optimum derived from a sequential run. As the result for multiple processes compared to the theoretical optimum shows, locality and cache capacity are not an issue for this particular workload, although it used a few hundred megabytes (MB) of memory per task (maximum speedup 22.3 with separate processes compared to a theoretical optimum of 24). The limitation of scalability to 8 CPUs or less for multi-threaded execution results in this case predominantly from maintaining cache coherence, an implicit scalability limitation.

A description will now be given regarding typical SMP cache coherence implementations.

Multiple processors with local caches and shared memory are often connected by a shared bus or fabric and use a "snooping" protocol to maintain cache coherence. A processor that writes to a cache line invalidates all other copies of the memory location covered by the altered cache line that reside in other caches. In a snooping protocol the writing processor broadcasts the invalidation on the bus or fabric and all caches including a copy of the affected memory location invalidate it by setting an "invalidation bit".

The access to the shared memory typically uses write serialization based on interconnect fabric atomicity. The same principle is in larger systems applied hierarchically if several central processing units (CPUs) share a cache. In IBM's Power 4 systems, 2 processor cores share a level 2 cache, and groups of processors on a module share a processor bus and a level 3 cache. The modules are connected with an additional level of busses.

Depending on the form of implementation, there are two structural limitations to scalability. A shared bus provides a mechanism for serialization, but the serialization of access to the shared bus is a point of contention. More complex fabrics avoid the single point of contention, but increase the latency of broadcasting operations.

Directory based systems do not broadcast invalidations. The directory (which may be distributed itself) serves as an arbitrator and routes invalidations to nodes that have copies. Here, the latency of broadcasting operations is also a limiting factor.

Current cache consistency/coherence models have two common properties. The time at which a local cache observes an invalidation depends on how fast it is transmitted through the bus or fabric, not directly on program semantics. The instruction set architecture provides a form of synchronizing instruction that establishes a barrier at which all processors have a common opinion on the state of the memory. Such a barrier ensures completion of operations, but does not prevent premature invalidations.

SUMMARY

The present invention is directed to asynchronous symmetric multiprocessing (SMP).

According to an aspect of the present invention, there is provided an apparatus for serializing concurrent requests to multiple processors of a computing device. The apparatus includes a signal merging tree structure and a traversal mechanism. The signal merging tree structure has a root node and a plurality of leaf nodes for connecting a data consumer to the root node. The tree structure is configured to serialize concurrent requests in the presence of race conditions. The tree structure is further configured to connect each of a plurality of request producers from among the multiple processors to a respective one of the plurality of leaf nodes. The traversal mechanism is configured to enable a request producer to transmit a signal from a leaf node corresponding to the request producer to the data consumer at the root node by setting all nodes on a path from the leaf node to the root node to a Boolean value true. The traversal mechanism is further configured to enable the data consumer to trace signal submissions of the plurality of request producers such that submission traversals by the plurality of request producers and trace traversals by the data consumer can be concurrently performed to allow the occurrence of data races between signal submissions by any of the plurality of request producers and between signal submissions by any of the plurality of request producers and the data consumer.

According to another aspect of the present invention, there is provided a method for providing a non-synchronized memory consistency model in a computing device having multiple processors that allow a shared memory programming model. The method includes the step of maintaining memory consistency with a corresponding broadcast-free, latency-hiding coherence protocol that permits the multiple processors to have incoherent views of a state of an address space. The maintaining step includes the step of utilizing a push instruction and a pull instruction to respectively export and import views to the multiple processors. The maintaining step also includes the step of utilizing an accepted invalidation bit and an unaccepted invalidation bit for each of a plurality of cache lines. The accepted invalidation bit is for causing a cache line miss when set and the cache line is accessed. The unaccepted invalidation bit is for causing the accepted invalidation bit to be reset in response to an issuance of the pull instruction. The maintaining step further includes the step of utilizing a tree based on point-to-point connections with leaf nodes corresponding to the multiple processors and internal nodes corresponding to administration units that allows broadcast free implementation of the push instruction and the pull instruction and atomic instructions and memory accesses.

According to yet another aspect of the present invention, there is provided a program storage device readable by machine, tangibly embodying a program of instructions executable by the machine to perform method steps for providing a non-synchronized memory consistency model in a computing device having multiple processors that allow a shared memory programming model. The method steps include the step of maintaining memory consistency with a corresponding broadcast-free, latency-hiding coherence protocol that permits the multiple processors to have incoherent views of a state of an address space. The maintaining step includes the step of utilizing a push instruction and a pull instruction to respectively export and import views to the multiple processors. The maintaining step also includes the step of utilizing an accepted invalidation bit and an unaccepted invalidation bit for each of a plurality of cache lines. The accepted invalidation bit is for causing a cache line miss when set and the cache line is accessed. The unaccepted invalidation bit is for causing the accepted invalidation bit to be reset in response to an issuance of the pull instruction. The maintaining step further includes the step of utilizing a tree based on point-to-point connections with leaf nodes corresponding to the multiple processors and internal nodes corresponding to administration units that allows broadcast free implementation of the push instruction and the pull instruction and atomic instructions and memory accesses.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
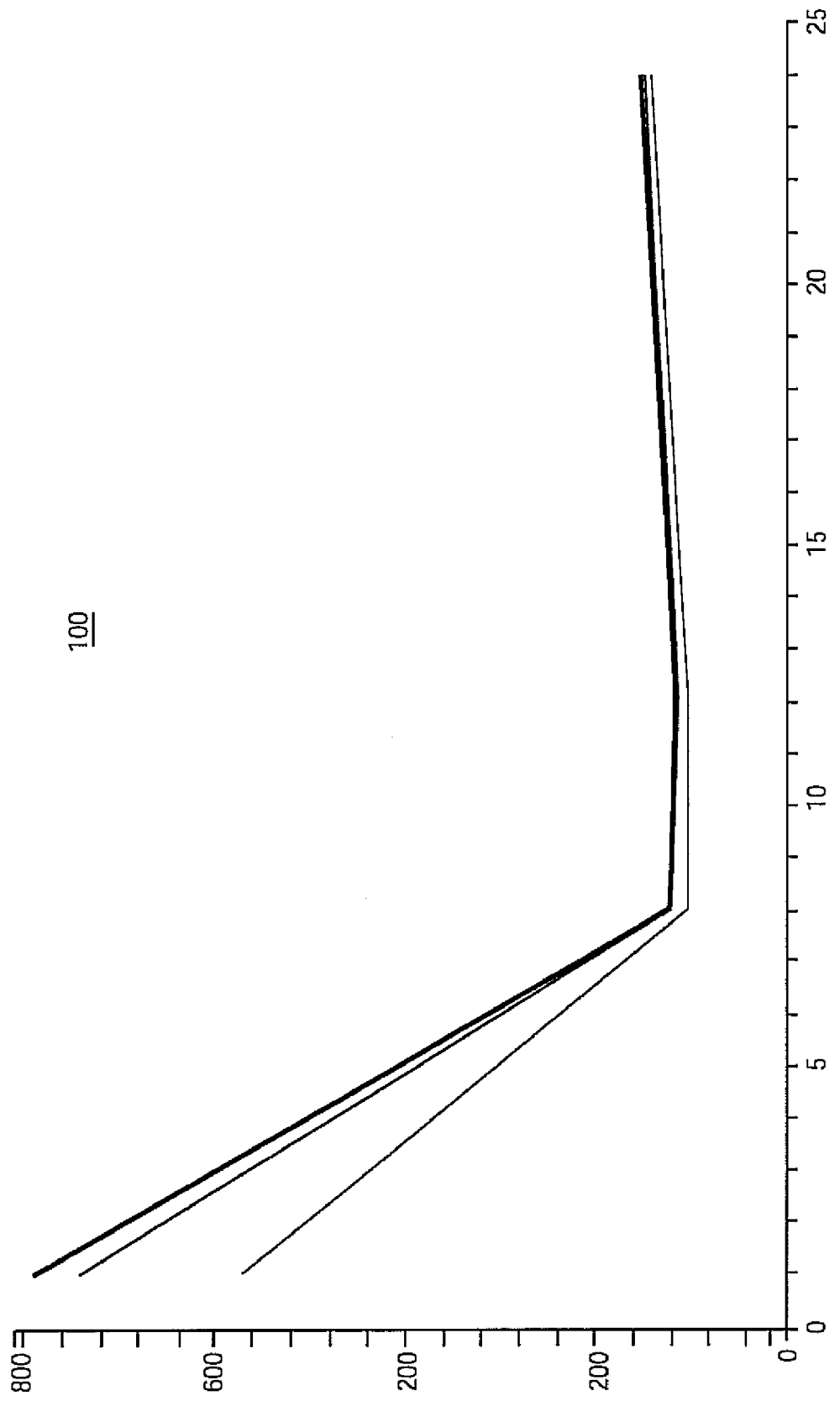
FIGS. 1A through 1C are plots illustrating results (runtimes) 100 110, and 120, respectively, for a benchmark derived from a practical task, VLSI net building.
Figure 1B:
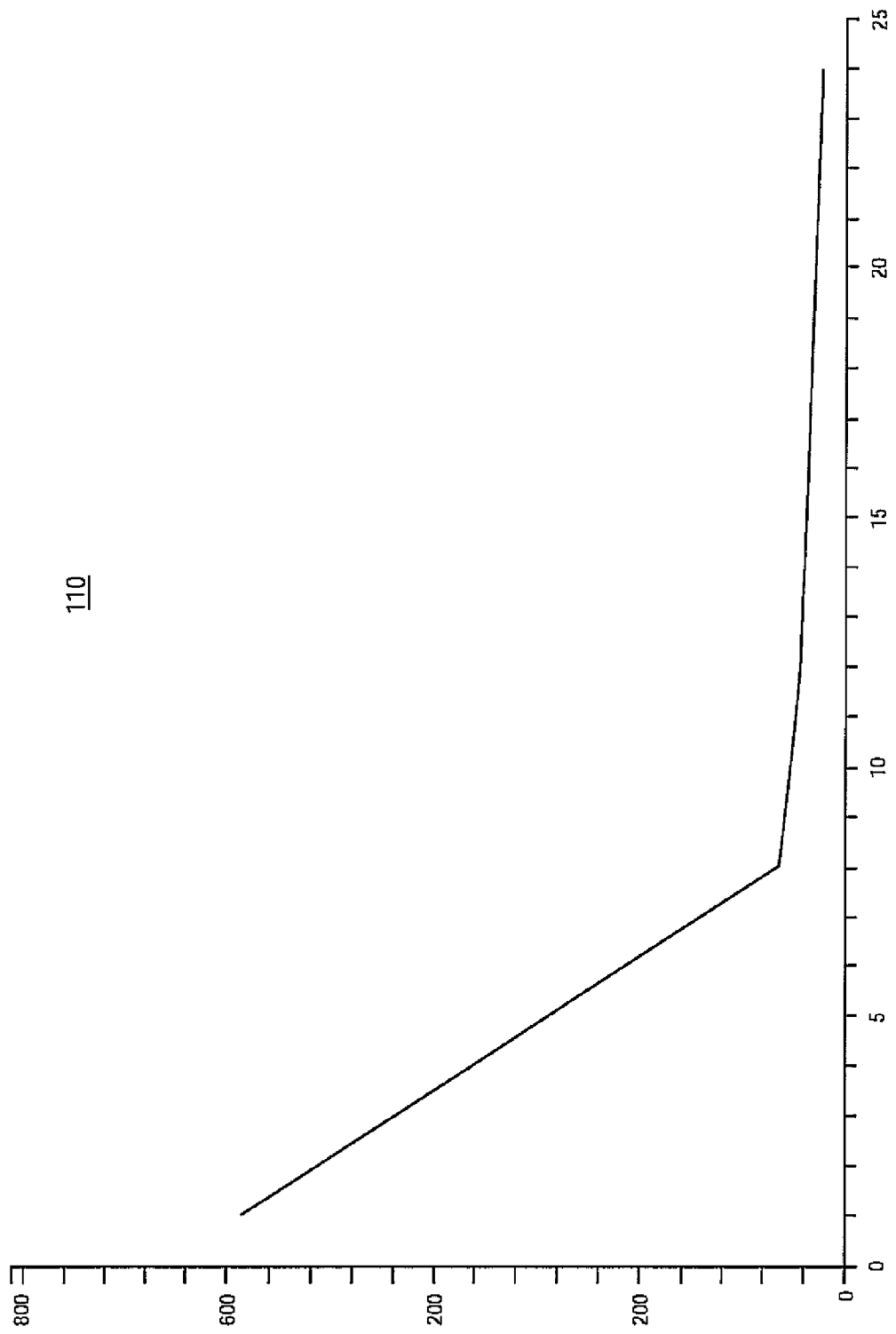
Figure 1C:
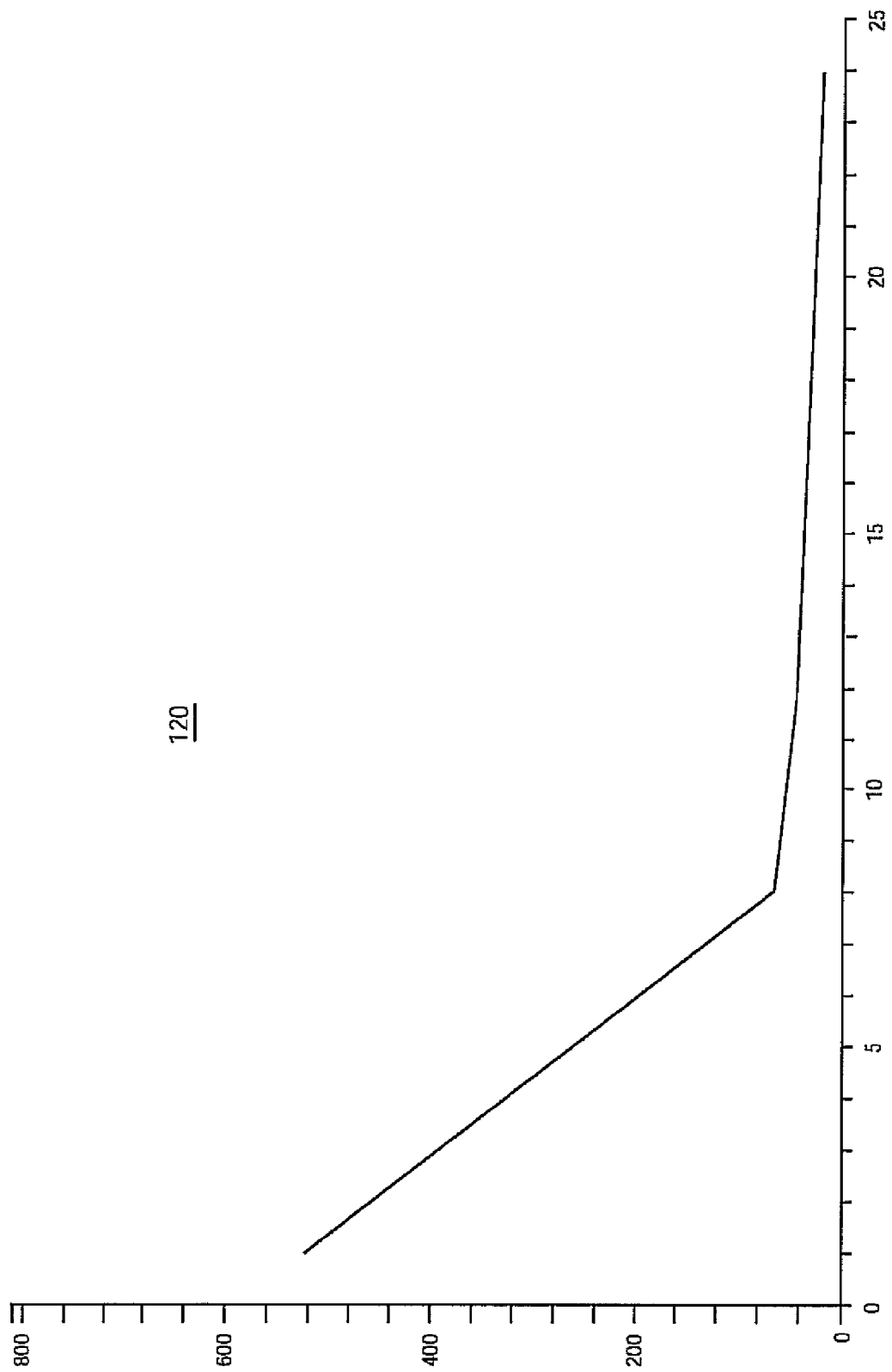

The present invention is directed to asynchronous symmetric multiprocessing (SMP).

The present description illustrates the principles of the invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

A description will now be given regarding asynchronous SMP.

The invention provides an alternative architecture for shared memory model systems employing one or more of the following aspects.

According to a first aspect, a pair of instructions, namely push and pull, is utilized instead of a synchronizing instruction, together with modified atomic instructions and an additional bit per cache line (also referred to herein as "unaccepted invalidation bit") to realize a relaxed consistency model with incoherent caches that more closely captures the semantics of high level shared memory programming models than current consistency models and coherence protocols.

According to a second aspect, a combination of the above-mentioned components is formed into a tree-based SMP architecture that does not require broadcasts.

According to a third aspect, nondeterministic logic is utilized to achieve serialization of parallel requests without mutual exclusive ownership to construct an arbitration unit used in the second aspect.

According to a fourth aspect, probabilistic request distribution to arbitration units is utilized to allow parallelization of arbitration requests.

A description will now be given regarding thread semantics.

A key factor in the popularity of SMPs is the simplicity of the shared memory programming model in higher-level languages as, for example, provided by the POSIX thread library or OpenMP. Thread libraries provide a dedicated application programming interface (API) for thread coordination based on the concept of mutually exclusive ownership.

Current SMP instruction sets take advantage of the explicit coordination of threads through weak consistency models. Operations related to thread coordination involve a combination of atomic operations, synchronization and assumptions about cache coherence. However, these instruction set architectures provide more coordination between processors than required by high level shared memory programming models such as, e.g., OpenMP and POSIX threads.

In a shared memory programming model based on ownership, semantically each thread has a "view" of the state of the shared memory. The initial view of a thread is inherited from its creating thread, after this point the views of different processors are semantically independent except for the exchange of ownership of parts of the memory. There is one additional view of the state of the memory, the shared memory itself, called the "objective view".

Semantically, memory can be in two states. Memory is "shared" if no thread has mutually exclusive ownership. All participants can read, but none are allowed to write. Memory is "owned exclusively" by a thread that, for example, acquired the lock which was associated with a particular set of memory cells or that has this memory assigned to it as thread specific. Only the owning thread may read or write.

A thread only has to update its view when it receives information from the outside through the API, e.g., by acquiring a lock, reaching a barrier or receiving a signal. These API mechanisms are usually implemented using locks. The updated view is a snapshot of the objective view. A thread transfers changes it made to the objective view when it releases exclusive ownership, typically by releasing a lock.

Figure 2:
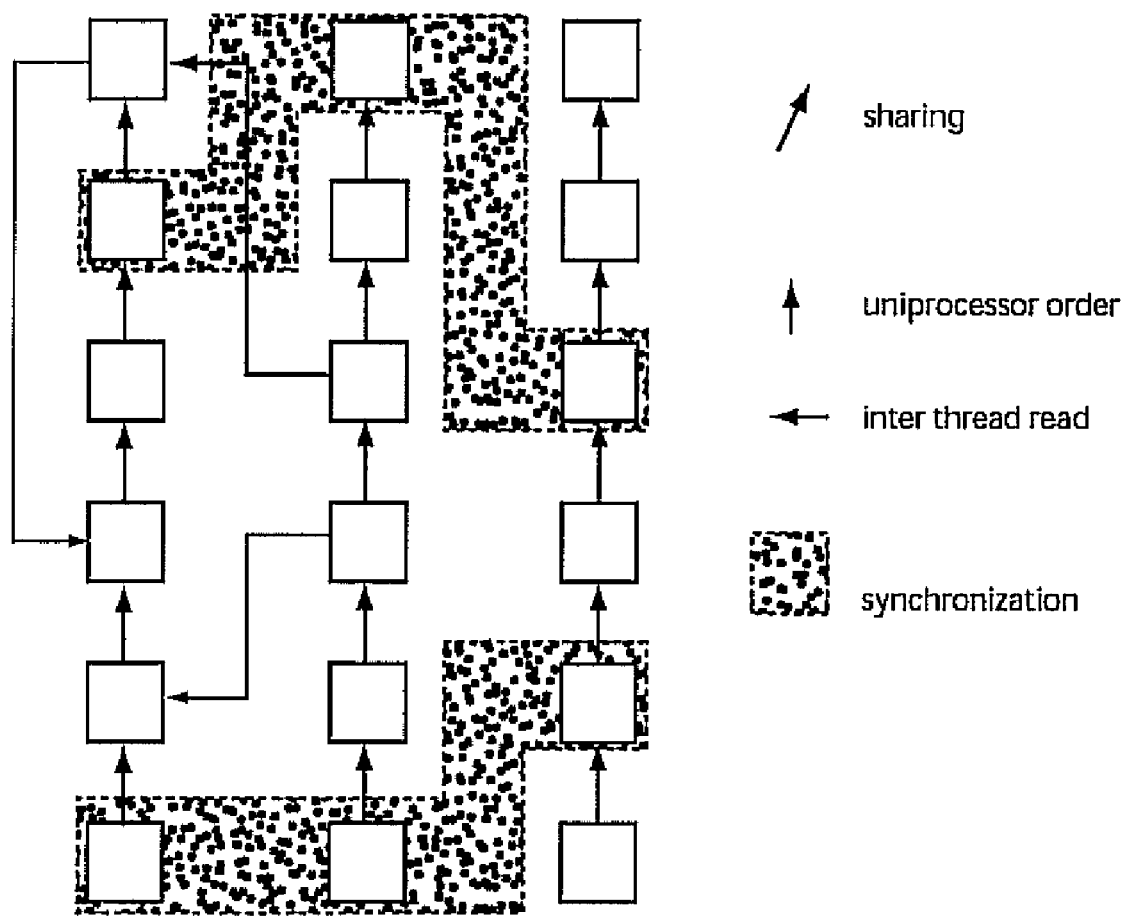
FIG. 2 is a dependency graph illustrating multiple threads 200 and their interactions.

The semantics provided by current system architectures are different. FIG. 2 is a dependency graph illustrating multiple threads 200. A synchronization instruction is undirected; it establishes a barrier that affects all processors. The result of concurrent writes, e.g., a race condition, is carefully defined, typically as one of the two written values. The transportation of a local update of a view through a write operation is transported in the form of an invalidation to all other views, either by broadcasting or by modifying a directory. Synchronization operations only ensure that all invalidations are completed. There is no mechanism that prevents an invalidation from being seen earlier than necessary. A processor may, for example, make a local change visible by broadcasting the invalidation without performing any synchronizing operation.

The semantic gap between the system and the high level programming model can be exploited to reduce the impact of explicit and implicit scalability limitations.

A description will now be given regarding cache line sharing.

Cache line interaction occurs when multiple caches and thus views include copies of the same memory location. Cache lines in modern systems are relatively large, e.g., 128 bytes. Larger cache lines reduce the amount of cache status information that has to be stored per byte of data and increase the throughput of the memory interface for sequential reading. On the other hand, larger cache lines cause cache line sharing. Cache line sharing occurs when multiple pieces of data that are not related to the same ownership control reside in the same cache line. There are multiple situations that lead to cache line sharing.

One situation that may lead to cache sharing is when private variables of multiple processors share a cache line. A write operation by one processor to the part is owns exclusively invalidates all copies in the multiple caches, causing unnecessary cache misses by read operations of the other processors.

Another situation that may lead to cache sharing is when private information and shared information coexist in a cache line. Even if a processor is, for a period of time, only reading its private information, the processor experiences a cache miss each time the shared information is altered by another processor.

Yet another situation that may lead to cache sharing is when shared information that is protected by different mutexes coexists in a cache line. Although both pieces of information are shared between the processors, the difference in the ownership over time introduces a sharing problem. The processor owning one piece of shared information experiences unnecessary cache misses related to operations on the other piece of shared information.

Although it is theoretically possible to avoid false sharing in software, this is not applicable in practice. Even complex and performance oriented software is commonly written in higher-level languages as C or C++ and its source code is intended to be portable between platforms. The object oriented approach suggests to combine data structures with their associated mutexes in a single class and the control of memory use prohibits extensive padding. Dynamic allocation and exchange of dynamically allocated memory between threads introduces sharing problems with increasing heap fragmentation. Thus, all but carefully crafted system level software is likely to experience cache line sharing. Furthermore even memory lines that include exclusively shared data may cause cache misses, if parts of the line are protected by different ownership controls, e.g., different mutexes.

The cache coherence traffic caused by cache line sharing is one of the major implicit scalability limitations. The cost of broadcasts that are associated with synchronization operations such as, for example, lock ownership transfers, are major contributors to explicit scalability limitations. Reducing these non-problem inherent scalability limitations allows parallel code to perform closer to the optimum that is defined by the scalability limitations inherent to the actual problem.

A description will now be given regarding push, pull and unaccepted Invalidations.

Replacing a synchronizing instruction (e.g., sync on Power4) with two instructions push and pull matches the directional character of high level APIs for parallel programming in the architecture. The push instruction (also interchangeably referred to herein as "push") transfers updates in the local view of the issuing processor that is created through its caches to the objective view. The push instruction "exports" a view. The pull instruction (also interchangeably referred to herein as "pull") sets the view of the pulling processor to a snapshot of the objective view. The pull instruction "imports" a view.

Note that exporting the view of a processor may export more information than the view of the thread issuing the instruction by also exporting the view updates from other threads that may still reside in the cache. While this does not reflect exactly the semantics of the high level programming model, it avoids the overhead of keeping track of which cache line was modified by which threads (multiple threads can modify a single cache line).

In modern architectures, synchronization does not cause the flow of memory lines themselves, but primarily the flow of status information. The actual data are only transmitted if really required. In the same fashion, push and pull transfer only status information in form of invalidation bits. That is, a push exports invalidations of memory lines. However, in order to take real advantage of the modified semantics, the other processor has to be prevented from picking up those invalidation bits before they pull. This allows memory lines to be present in multiple states that are distributed over the various caches and perverts premature invalidations.

In order to buffer invalidation bits, each cache line has an accepted and an unaccepted invalidation bit. The accepted invalidation bit acts like a conventional invalidation bit, e.g., an access to a cache line with the bit set causes a cache miss unless it is a write operation that alters the entire line. The unaccepted invalidation bit has no effect until a processor connected to the cache issues a pull instruction. At this point, the accepted invalidation bits become the OR of accepted and unaccepted invalidation, and the unaccepted invalidation bits are reset to zero. Since all these bits are present in the same location, this operation can be fully parallelized.

The combination of push and pull with unaccepted invalidation bits has several beneficial consequences as follows. One consequence is that a processor can remain on a stale view as long as it does not perform a pull. High level semantics ensure that no newer information than its view is relevant. A thread is not allowed to access memory areas updated by another thread without performing an appropriate thread coordinating operation.

Another consequence is that if the system supports partial writing of cache lines, the system may update cache lines without notifying anybody until the cache line is actually written out or a push is performed.

Yet another consequence is that a processors view of the memory may even include pieces of information that are newer than the view it operates on. These pieces are introduced by cache misses to lines with shared data that were updated by another thread with a view that is more recent in time. Although the view of each processor in the system is allowed to be different at any given time and each view is allowed to include information that is not coherent with the current view of the working thread, the high level program semantics do not permit the thread to access data that are not coherent with its current view since it did not acquire new information through a thread coordinating operation that caused a pull.

Note that in this scenario the caches do not have to be coherent at any point in time, the communication scheme is somewhere between coherent views of the memory and message passing. The degree of freedom gained by relaxing coherence requirements can be used to hide latencies and to avoid broadcast operations.

A description will now be given regarding atomic instructions and locks.

In current architectures, the implementation of thread coordinating functionality is based on a combination of synchronization and atomic instructions, e.g., the load reserve and store conditional instructions in the Power architecture.

The atomic instructions are typically used to alter the state of a mutex (i.e., lock) such that in the case of a race condition there is a unique winner and each participant (i.e., thread trying to alter the mutex) is informed whether or not it was successful. After such a successful lock ownership transfer, a synchronization operation is necessary to ensure that write operations by the previous owner and the new state of the mutex are visible to other processors.

A thread that finds a lock owned by somebody else has to wait until the lock is released before that thread can make an attempt to acquire it. The thread has to monitor the current value of the lock until it becomes available. This happens when the owning thread writes a value indicating availability to the mutex and performs a synchronization operation. This ensures that the invalidation in the cache of the previous owner becomes visible to the monitoring thread. A common technique is, for example, spinning on the lock value.

The replacement of a synchronizing instruction by push and pull requires either a monitoring thread to pull continuously (an undesirable situation) or to slightly alter the semantics of the atomic instructions to bypass the accepted invalidation layer. In the case of the load reserve—store conditional combination, the load reserve instruction can be used to bypass the invalidation buffering such that it is able to observe an invalidation at the target address without pulling, i.e., without unnecessarily invalidating the entire view of the processor. The explicit request for a particular memory location can also be used to bypass buffering of state changes for this particular location without disturbing latency hiding techniques as queuing and prefetching of invalidations for general locations.

A description will now be given regarding a tree based asynchronous SMP system.

Figure 11:
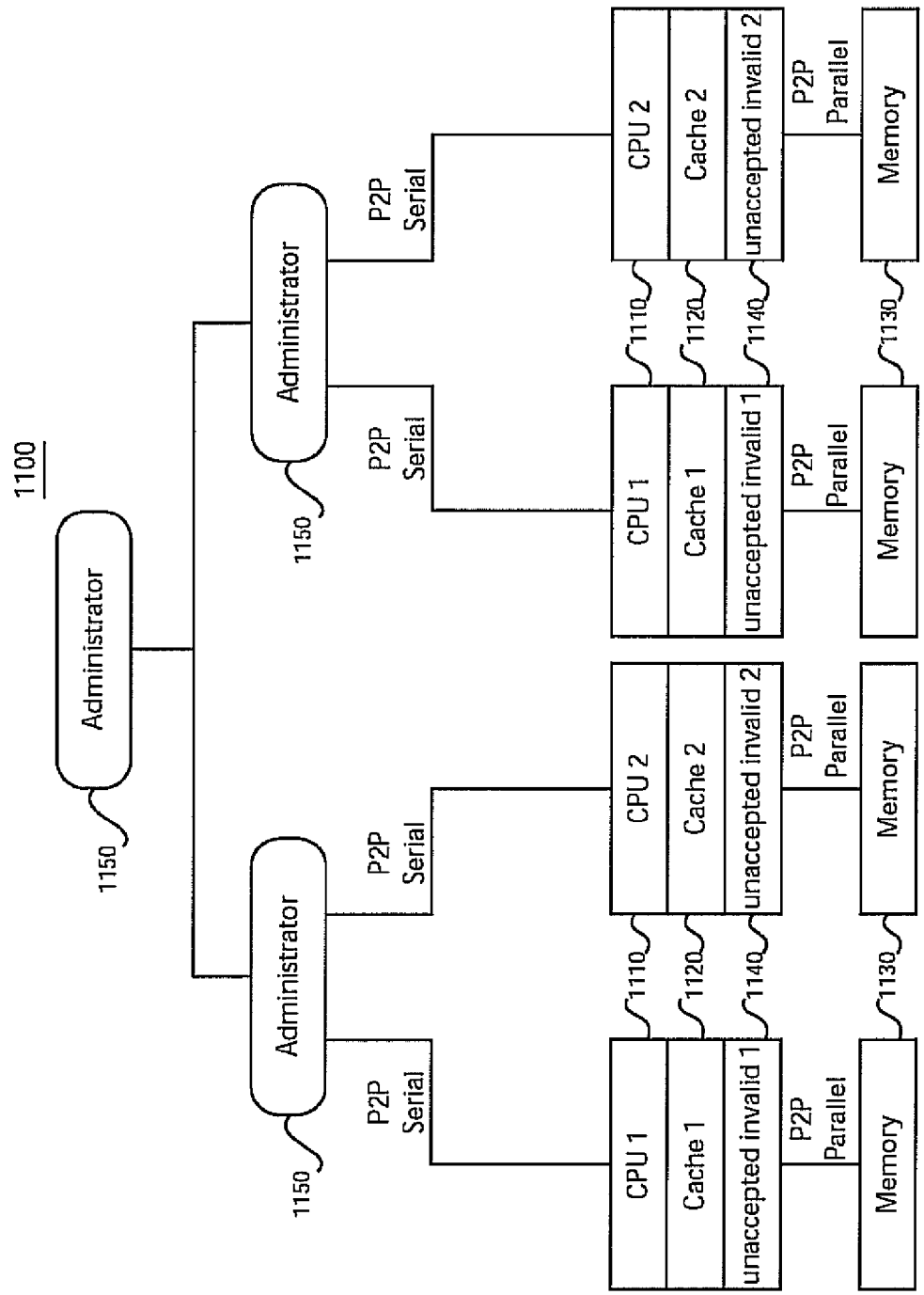
FIG. 11 is a diagram illustrating a tree based architecture 1100 implementing the push-pull based extension to a single-CPU instruction set.

FIG. 11 is a diagram illustrating a tree-based architecture 1100 implementing the push-pull based extension to a single-CPU instruction set. The leaves 1110 of the tree are processors, each with its own cache 1120 and part of the shared memory 1130. It is presumed that in addition to support for unaccepted invalidation bits 1140, the architecture supports partial writing of cache lines, either by using additional status bits or by maintaining a copy of the original content such that effectively altered bits can be determined by comparison of the altered state to the state originally loaded to the cache. Note that the latter scheme requires mutual exclusive ownership for write operations to write correct programs. Code, for example, that relies on the fact that in case of a race condition the result has to be one of the multiple values attempted to write concurrently will not work with scheme 2. Each leaf node 1110 has information about the memory 1130 (e.g. page tables) and cache lines 1120 (and their states) that it owns.

Internal nodes in the tree are so called administrative nodes 1150. An administrative node 1150 has information about memory pages and cache lines for all the leaf nodes in the sub-tree for which it is the root. The administration nodes 1150 route information about changes in cache line states and their content between owning and requesting leaves. Administration nodes 1150 also include hardware arbiters to serialize parallel requests based on the signal merging tree (further described herein below). Administration nodes may also include parts of the main memory and/or caches for memory states in the subtree rooted in the administration node.

Memory page operations are routed up the tree and alterations to page locations are stored in each administrator 1150 on the path. Note that administrators 1150 can internally store multiple requests.

A cache miss that can be satisfied from local memory remains in a leaf node. Unused local memory and/or an L2 cache can be used to cache the contents of remote memory.

A cache miss that requires remote memory is routed up the tree until it reaches a node whose page table includes the mapping for the required virtual memory address. Spatial locality allows for the restriction of communication to sub-trees. The new mapping and state of the cache line is recorded in administration nodes from leaf to root. A part of this path is already covered by the request.

The answer to a remote request is routed through the tree to its destination together with information if the memory line was cached in the leaf node providing the answer. Only the status information is propagated up to the root.

For a first write to a clean cache line (changing its state to dirty) that is marked as "shared", i.e., is present in other caches, the status change is routed up the tree and distributed to all leafs that include a copy of the same memory address. Status change distribution can be queued at any position along the path to use free bandwidth when possible. Note that up the tree, the chain of queues in administrators is de facto a single queue, down the tree distribution causes a tree of queues where nodes with multiple outputs route copies to children nodes only if necessary, i.e., if the sub-tree rooted in a child actually has a leaf node including a copy of the memory line in question.

A push operation is routed up the tree and distributed. A marker is inserted into the queues that is tagged with the sequence number of the last pull operation. The presence of a push in the queue can be used to increase the priority of routing queued status changes previous to the push to "anticipate" for the next pull. That is, the leafs "prefetch" status changes into their unaccepted invalidation bits. Note that push markers indicate visibility barriers in the queued status changes.

Pull operations are serialized amongst themselves through hardware arbiters in the administrators. The root node separates groups of push operations from pull operations such that there is a correct decision which pushes occurred before which pull. The pull request is routed through the tree and causes all queued status changes associated with pushes previous of the pull to be propagated with highest priority. The pull is complete if all status changes of previous pushes are pulled from queues leading to the pulling leaf. In the best case, all status changes were already prefetched and buffered in the unaccepted invalidation bits.

For a load reserve operation, the request is routed through the tree to the root (using the hardware arbiters) to determine whether or not the state of the cache is up to date. If not, then a request for the state at the last push for this address is routed down the tree, the first administration node on the path with the required information sends it up and it is also routed to the requester.

A store conditional operation requests the write access through the hardware arbiters. Load reserve and store conditional operations to the same address are serialized through the hardware arbitration, so that exactly one requester wins. All contenders are informed about whether their request was granted or rejected.

The semantic of the push-pull instructions allow the tree of administrative nodes to queue cache line status changes and thus hide a significant amount of latencies. Queues only have to be flushed when a pull operation occurs. Pull operations occur even in programs with relatively fine-grained synchronization thousands of clock cycles apart. Since invalidations can be "pre-sent" before the actual push and "prefetched" before the actual pull, there is a significant probability that the majority of status changes are already in the local unaccepted invalidation bits when a pull is performed.

The push-pull protocol implementation through a tree has some interesting properties described immediately herein after.

Only operations that are expensive by themselves, e.g., explicit synchronization, page transfers, atomic instructions and cache misses that require remote access, leave a leaf node. In well-behaved programs (cache efficient, good ratio of computations per explicit synchronization), these events are relatively rare.

The tasks required from administration nodes allow parallel execution within the administration node, e.g., feeding multiple downstream queues, receiving information from multiple upstream channels, and so forth.

Only cache and memory status information, explicit synchronization and atomic instructions have to be routed to the root node. Actual data, e.g., for a remote memory access, can be restricted to the smallest sub-tree including source and receiver. Thus, spatial locality reduces the bandwidth requirements in higher levels of the tree, such that the root node does not require the combined bandwidth of the connections to leaves.

The queuing of status information allows for the bundling of multiple status changes in a single package for transmission, which reduces bandwidth usage through the protocol overhead in the connections.

The latency within the tree grows logarithmically with the number of processors. Even if it is presumed that the bandwidth requirement between generation i and generation i+1 is identical, i.e., the bandwidth into the root is identical to the sum of the bandwidths to all leaves, the size of the infrastructures grows with N log(N) with the number of processors.

If threads of one process are placed on CPUs in a sub-tree, then status information routing and resolution of atomic instructions can be restricted to that sub-tree, such that ideally different processes residing in different sub-trees execute without any communication.

The structure is modular, such that a set of independent boxes can be connected by adding a box with an administration unit. This can be applied recursively.

A description will now be given regarding concurrent signal merging.

The merging of signals from multiple producers into a single consumer may be seen as the core functionality in multiprocessor coordination. The contention for a lock is such a scheme, the contending threads signal their interest in the lock and the system gathers all signals and assigns the lock to one of the contenders. A basic atomic operation falls into this category. Multiple processors signal their interest in writing to a certain location and the system gathers all signals and ensures that exactly one participant is successful and that all participants are notified about the outcome.

A communication protocol will now be described, namely a concurrent signal merging tree, which allows the concurrent submission of signals by multiple producers to a concurrently operating consumer without the requirement of mutual exclusive access, i.e., in the presence of races. This is achieved by allowing the structure to enter states that are not possible in a race-free environment. The design of the structure ensures that correctness is not affected and that the latency variation introduced by non-determinism is limited to a small constant factor.

Concurrent signal merging performs the task of serialization of concurrent requests. Concurrent signal merging ensures that each signal is received exactly once such that a linear order among the signals is established. Let N be the number of producers. Then, the latency between the first submission of a signal and the first reaction associated with a signal is $O(\log(N))$. The amortized cost for gathering k signals is $O(k \log(N))$ in the worst case. The latency between the submission of a signal a and the reaction associated with a depends on the number of signals submitted concurrently to a and is $O(k \log(N))$ in the worst case, in which a is the last signal the system reacts to out of k concurrently submitted signals. The provided bounds assume that the reaction to a signal, which has to be performed in addition to the gathering of the signals, takes constant time.

A description will now be given regarding the signal merging structure and a corresponding algorithm according to the invention.

Figure 3:
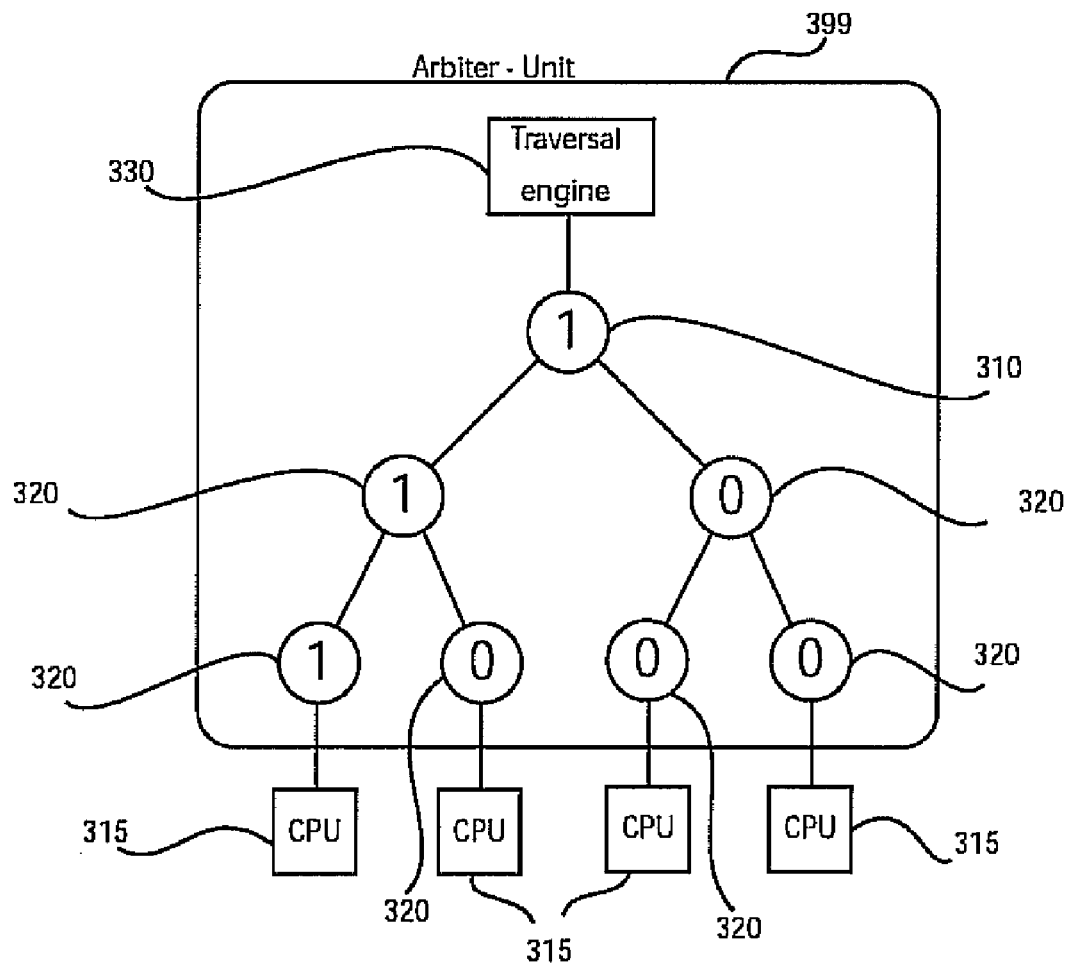
FIG. 3 is a diagram illustrating a compacting tree data structure 300 for concurrent signal merging.

FIG. 3 is a diagram illustrating a compacting tree data structure 300 for concurrent signal merging. A compacting tree is a balanced tree such that the consumer is connected to the root node 310 and the producers 315 are connected to the leaf nodes 320. Each tree node includes a Boolean value. A (conceptual) traversal engine 330 is connected to the root note. The traversal engine 330 and the tree 300 form an arbiter-unit 399. It is to be appreciated that while the present invention is described herein with respect to a binary tree, the present invention is not limited solely to binary trees and, thus, other types of tree including non-binary trees may also be employed by the present invention while maintaining the scope of the present invention.

The following protocol establishes the transmission of signals from the sources to the sink.

Figure 4:
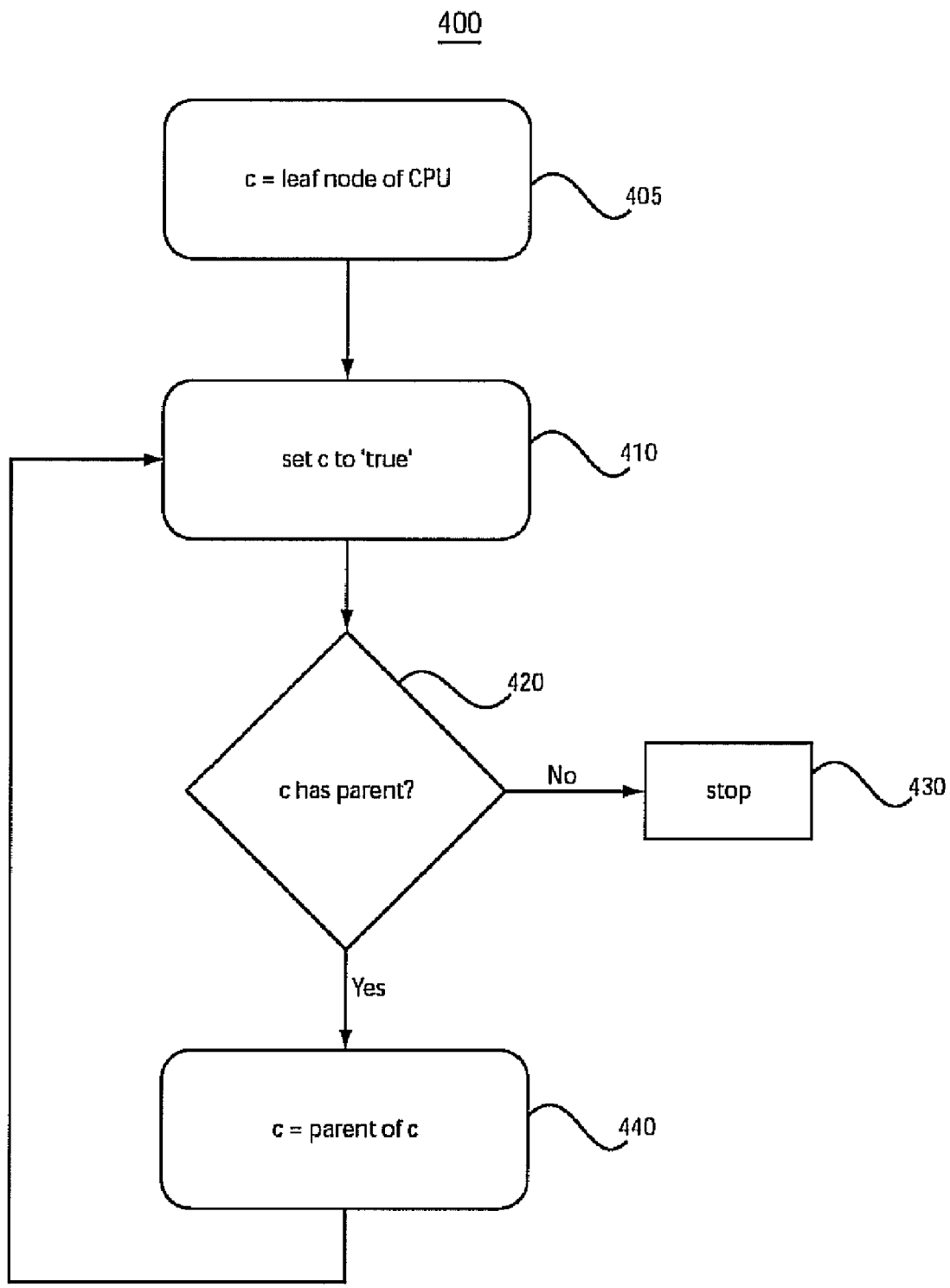
FIG. 4 is a flow diagram illustrating a method 400 of signal propagination by a leaf node with respect to the compacting tree of FIG. 3.

In one aspect of the protocol, a source that intends to transmit a signal traverses the path from its leaf to the root until it reaches the root node and writes true to all encountered nodes (see FIG. 4). FIG. 4 is a flow diagram illustrating a method 400 of signal propagation by a leaf node with respect to the compacting tree of FIG. 3. With respect to the method of FIG. 4, c=leaf node of the CPU (405). c is set to true (step 410). It is then determined whether or not c has a parent node (step 420). If not, the method is terminated (step 430). Otherwise, c is set to the parent node of c (step 440), and the method returns to step 410.

In a second aspect of the protocol, the sink monitors the root node until it detects the state true.

Figure 5:
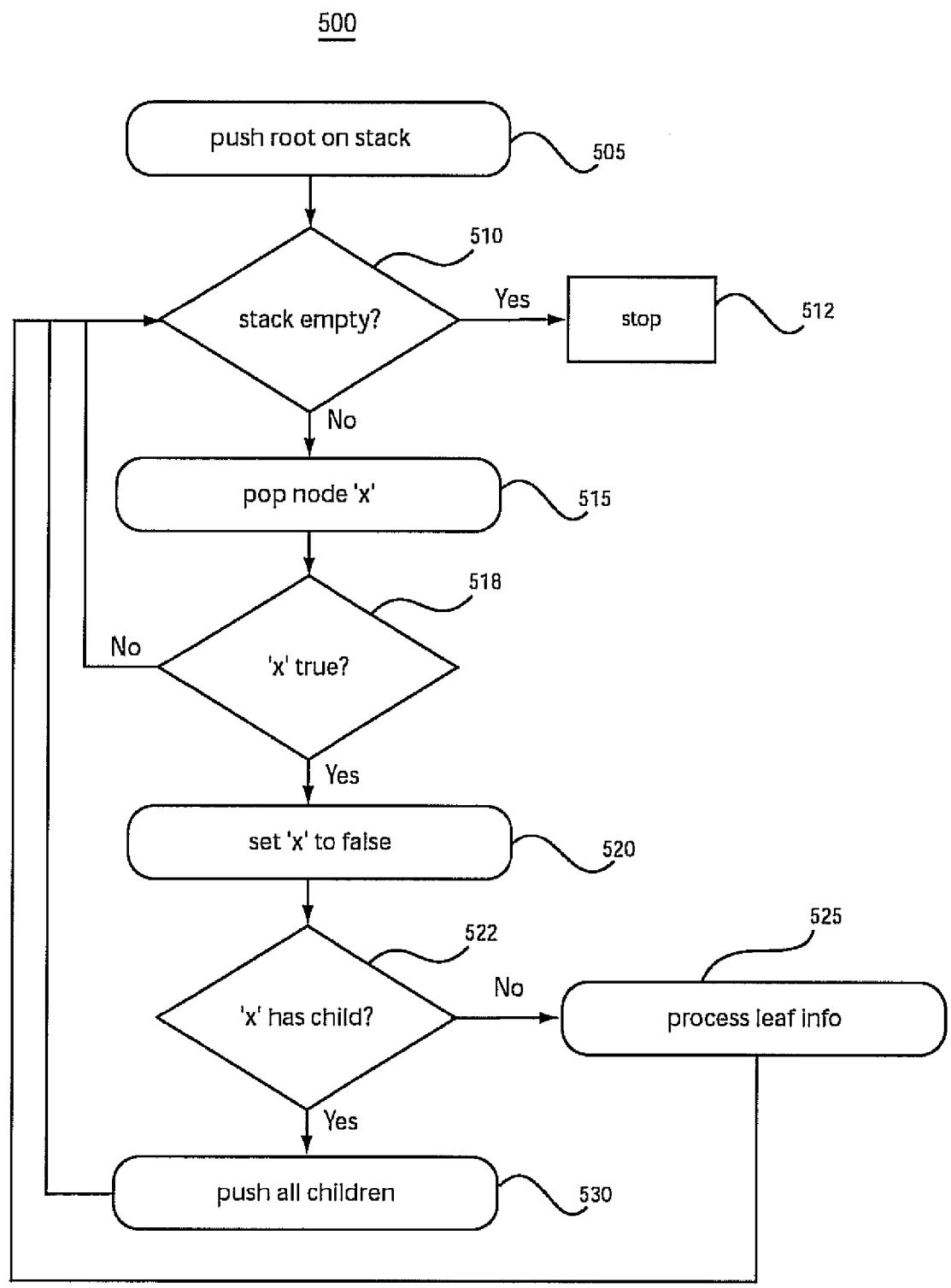
FIG. 5 is a flow diagram illustrating a method 500 for traversing the compacting tree of FIG. 3 by an arbitration unit.

In a third aspect of the protocol, upon detection of the value true, the sink traverses the connected sub-tree of true nodes that includes the root node in depth first order (see FIG. 5).

FIG. 5 is a flow diagram illustrating a method 500 for traversing the compacting tree of FIG. 3 by an arbitration unit (e.g., arbitration unit 399 of FIG. 3). The root node is pushed onto a stack (step 505). It is then determined whether the stack is empty (step 510). If so, then the method is terminated (step 512). Otherwise, if the stack is determined to not be empty, then a node is popped from the stack (step 515). The Boolean status of the popped node is tested to determine whether or not the status is equal to "true" (step 518). If the status or the popped node is not true, then the method returns to step 510. Otherwise, if the status of the popped node is true, then the status of the popped node is reset to "false" (step 520). It is determined whether or not the popped node has any child nodes (i.e., whether the popped node is a leaf node) (step 522). If the popped node has no child nodes, then corresponding leaf information for the popped node is processed (e.g., a signal from the associated producer is recorded) (step 525). Otherwise, if the popped node has child nodes, then all of the child nodes of the popped node are pushed onto the stack (step 530) and the method returns to step 510.

Note that the Boolean status of each leaf node may be used as a handshake on an associated buffer. The sink may read the buffer if the node is true, the source may write to the buffer if the node is false. The binary tree does not include any ordering, e.g., left and right children are equivalent. Priorities may be attached to the nodes depending on recent visits to establish traversal policies, e.g. fair distribution of the latency.

There are races between sources and the sink, sources may write concurrently to the same node and signal propagations by multiple sources may occur concurrently to a traversal by the sink. A description is given herein below regarding why each signal is obtained exactly once with a latency that is limited by the cost of one traversal in the case of contention and that is limited by the depth of the tree if there is no contention.

A description will now be given regarding surplus signals (see FIG. 6A to 6E).

The described protocol implements the equivalent of a round robin visit. Each time the value true is detected in the root node it basically checks all sources, using the binary tree structure to prune sub-trees without contribution. Thus one traversal is equivalent to a linear scan of all leaf nodes, but without paying 0(N) operations to pick up a constant number of signals.

Consider the case in which the compacting tree is protected by a lock. Each signal propagation and each traversal is uninterrupted. Traversing a sub-tree that leads to signals from k leaf nodes takes $O(k(\log(N)-\log(k)+1))$ operations, where N is the total number of leaf nodes. Since each node is set exactly once to true, submission may stop in this case when a true node is encountered, the total work of all signal propagations takes also $O(k(\log(N)-\log(k)+1))$ operations. That is, in a low contention scenario the amortized cost per signal is $O(\log(N))$ and in a high contention scenario it drops to $O(1)$.

Since the tree is not protected by a lock, two questions arise. That is, why does it work correctly without a lock and what is the impact on the complexity? Without a lock, races between traversal and submissions occur and the state of nodes is not defined. It is described herein after that races cause only a controlled amount of "surplus signals".

Figure 6A:
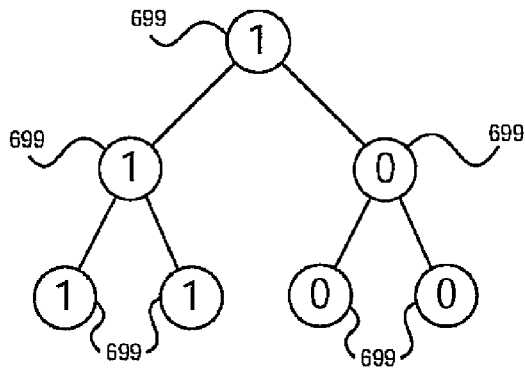
FIGS. 6A through 6E are diagrams illustrating examples of concurrent submissions and traversal.

To establish correctness, it is necessary to show that a signal propagation starting at leaf $P_i$ causes the root node to turn true with a latency of at most $O(\log(N))$ operations. This is the case because each signal propagation writes true to the root node with latency $O(\log(N))$. The path of true nodes may be established earlier due to overlapping paths of earlier submissions (FIG. 6A).

Further, to establish correctness, $P_i$ is visited in one of the following: a traversal concurrent to the signal propagation; a traversal that directly follows a traversal concurrent to the signal propagation; a traversal started by the root turning true for an idle sink.

Since the traversal visits only nodes that are true and each signal submission sets at most $O(\log(N))$ nodes to true, the bounds for the latency of the first reaction to the first submission ($O(\log(N))$) and amortized cost of a signal reception ($O(\log(N))$ per signal) hold.

Concurrency between signal propagations does not alter the behavior of the tree. Concurrency between signal propagations only causes nodes that are already true to be overwritten with true redundantly. Thus, concentration is directed to the concurrency between a signal propagation and a traversal.

There are two types of races possible, namely a direct race and an indirect race. In a direct race, the writing of false by the traversal and the writing of true by a submission collide in a single node. In an indirect race, a traversal and a submission overlap, but without a direct race.

In a direct race, the writing of false and true by consumer and producer collide. The producer only writes to nodes whose children will be visited later (they will be pushed onto the stack). A direct write race between consumer and producer on v ensures that the status of true of v's child u is visible to the producer, since the submission does not write to v until the write to u is completed.

Thus, the producer will visit u and pick up the signal, even if the write of true to v was lost due to the race. Thus, the signal propagation leaves a path of true nodes from v's parent or v to the root that does not lead to a leaf node with information. This is a surplus signal at the root node that causes a traversal of nodes that does not lead to a real signal. The observation that at most one direct race is possible between one traversal and one submission concludes the discussion of direct races.

Let P be the leaf node of a submission in an indirect race with a traversal. If P was already visited when the submission starts, the entire path from P to the root is false and the submission will switch the path to true. The next traversal will find and traverse this path.

If P was not visited by a concurrent traversal at the time the associated producer starts a signal propagation, the signal propagation will hit a node v that was not visited by the traversal whose parent u was already visited.

If u was false when it was visited by the traversal, its sub-tree will not be visited. The signal propagation will create a true path between P and the root that is picked up in the following traversal.

If u was true when it was visited by the traversal, v was pushed onto the stack for a later visit. Since there is no direct race, the traversal will visit v after the signal propagation sets its value to true and it will find the information at P, resetting the path from v to P to false. Thus, the signal propagation leaves a path of true nodes from u to the root that does not lead to a leaf node with information.

Thus, all signals will be picked up timely and the only states the tree reaches that are not achievable in the presence of mutual exclusive access lead to surplus signals.

Figure 6B:
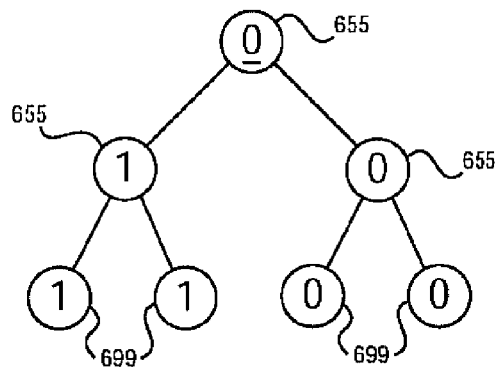
Figure 6C:
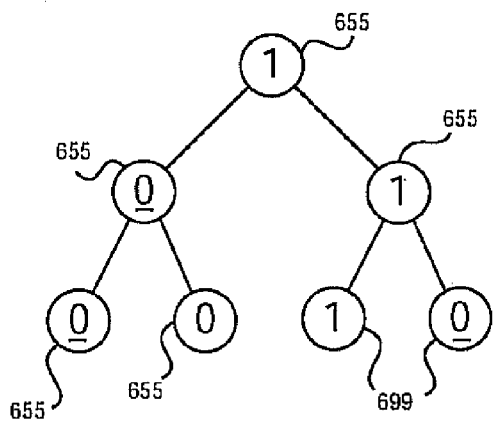
Figure 6D:
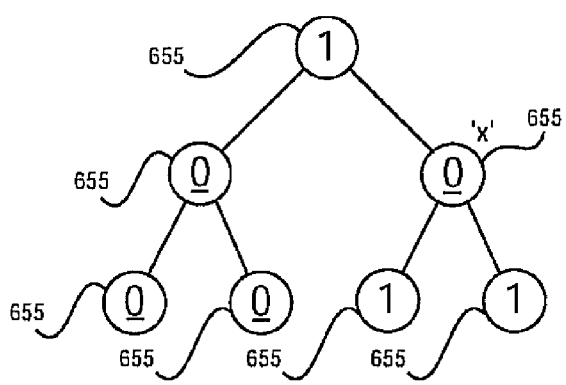
Figure 6E:
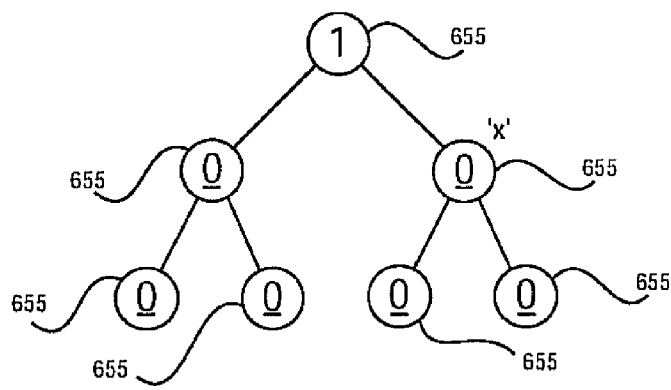

FIGS. 6A through 6E illustrate an example with several submissions and one traversal. A circle with the reference numeral 655 indicates that a node is or was on the stack of the traversal. A circle with the reference numeral 600 indicates a node that is not or was not on the stack of the traversal. An underlined number indicates that a node was traversed and removed from the stack. In FIG. 6A, two nodes completed overlapping submissions, which result in a sub-tree of nodes in state "true". This triggers a traversal. In FIG. 6B, the root traversal is complete (its state is reset to "false") and the two children of the root are on the stack. FIG. 6c illustrates an indirect race, while the traversal completes in the left sub-tree of the root node, a node in the right sub-tree completed a submission. FIG. 6d shows a direct race. The traversal visited the node marked with "x" while the rightmost child was submitting a signal. Submission and traversal write concurrently to node "x" and in the example the traversal wins, i.e., the setting of "true" by the submission is lost. However, since the traversal placed the children on the stack before resetting node "x", it will find the submission of the rightmost node when subsequently visiting the children of "x". After completion of the four submissions and the traversal, the tree is left with a "spurious signal", i.e., the root node is in state "true", but there is no path to a leaf node in state "true" with an actual submission (FIG. 6E).

Note that the proof of correctness outlined above relies only on the completion of the write operation in the child before the write operation in the parent is started during signal propagation. Instead of using a stack, the algorithm can also be implemented by other means, e.g., with logic in each node.

Such a logic receives a trigger through an "up" pin from a node higher in the tree, checks the state of the node, resets the state, sends a trigger first to the left and then to the right child nodes, waits for completion signals from each child, and finally signals completion back through its up-pin.

A description will now be given regarding serialization and pipelining.

The compacting tree generates a mechanism for serialization of signals. Since the status of a leaf node provides a handshake for an attached buffer as described above, the serialization of any submission of information can be established. In particular, the information attached to a signal may be a task that has to be performed on a shared resource. The submitted information may include a pointer to references of code and data. The consumer may "execute" this task by causing an interrupt on a CPU.

The use of a single buffer with access control through the status of the leaf node prohibits the producer from the submission of further information until the signal was received by the consumer. In scenarios that "pipeline" information through a network in which the consumers are CPU's, it is desirable to provide buffering capacity to allow concurrent submission and reception as long as the capacity of the consumer is sufficiently large. This is easily achieved by adding a ring buffer in which each entry has a Boolean variable that indicates ownership by producer (true) or consumer (false). The signal in the compacting tree indicates in this case that new slots were filled by the producer.

A description will now be given regarding general communication networks.

The mechanism of concurrent signal merging and a simple handshake with a Boolean variable allows the construction of general communication networks. Such a communication network may be modeled as a directed graph. In the following, it is presumed that with a signal a workload may be transmitted and that the consumer has the means to cause the execution of this workload.

Figure 7:
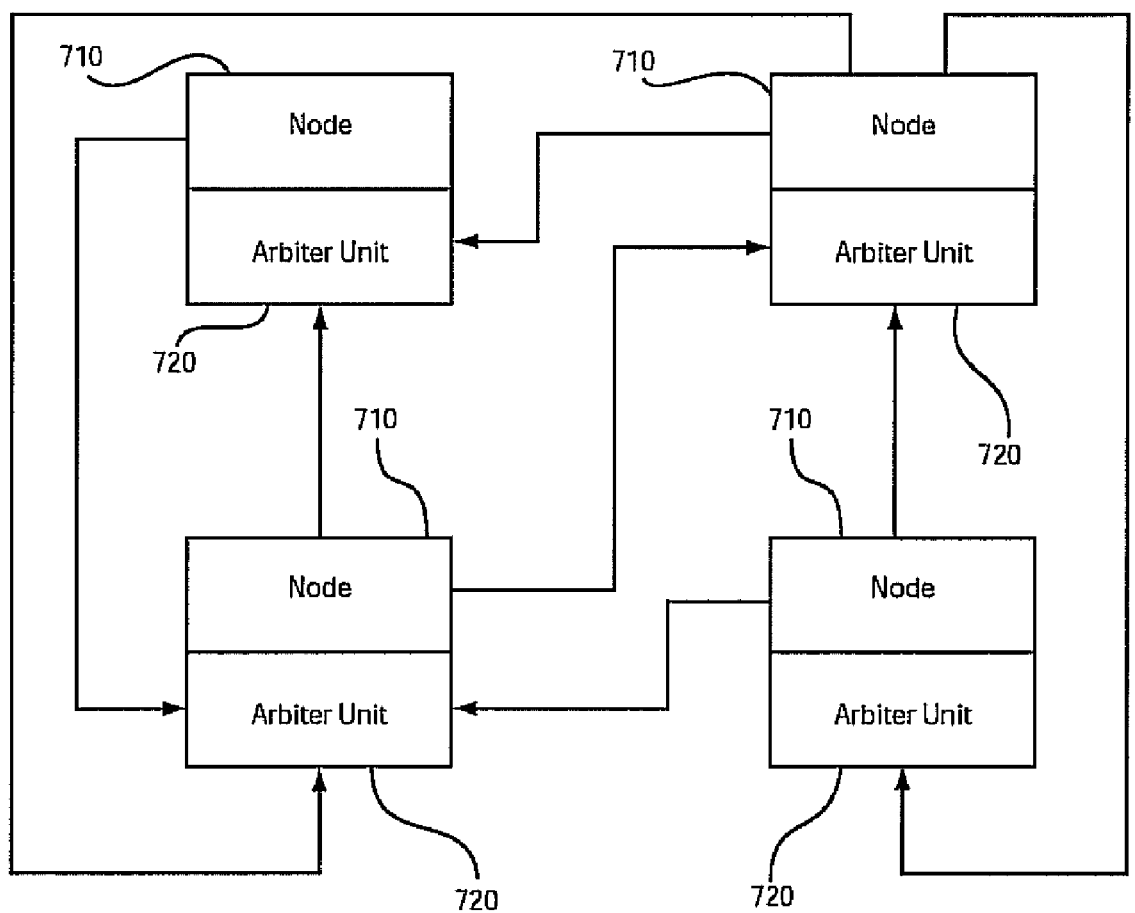
FIG. 7 is a block diagram illustrating an architecture 700 for building general communication networks for routed information packages.

Each node v in such a general communication network is the root of a compacting tree. The directed edges ending in v are connected to the leaf nodes of the tree of v. An edge from v to another node w is connected to a leaf node of the compacting tree of in. Passing a routed package through the network requires amortized o(log(d)) operations per "hop" (see FIG. 7). FIG. 7 is a block diagram illustrating an architecture 700 for building general communication networks for routed information packages. The architecture includes nodes 710 and arbiter units 720. All incoming connections into a node 710 are processed through an arbiter unit 720.

Two types of functionality are desirable for general networks, a facility for broadcasting from one node to all its neighbors and the dynamic alteration of the network. Mechanisms/approaches for accomplishing these tasks are described herein below.

A description will now be given regarding dynamic compacting trees.

So far, the scheme under the assumption of a static set of sources with a single sink has been described. Immediately herein after, a dynamic set of sources is considered. The idea is to maintain a binary signal tree whose depth is bound by 0(log(T)), where T is the number of sources. Since rotations pose a severe problem, a start is made with a balancing scheme without rotations, using the fact that the tree does not have to represent any order.

The alteration of the tree, i.e., the addition or subtraction of a leaf node, is performed by the "consumer" attached to the root of the tree. Depending on the source of the alteration request, a mechanism for signaling the request to the consumer of this tree is necessary. One possible scenario includes that each producer may request modifications. This is easily handled by allowing an appropriate workload to be attached to a signal. Another possible scenario involves a single entity, e.g., the operating system, requesting the modifications. This is solved by starting with a tree with one specialized leaf node owned by this entity. This scenario also allows a variable number of non-producer entities, e.g., kernel threads, as long as there is a starting point with a fixed number of specialized leaf nodes.

Figure 8:
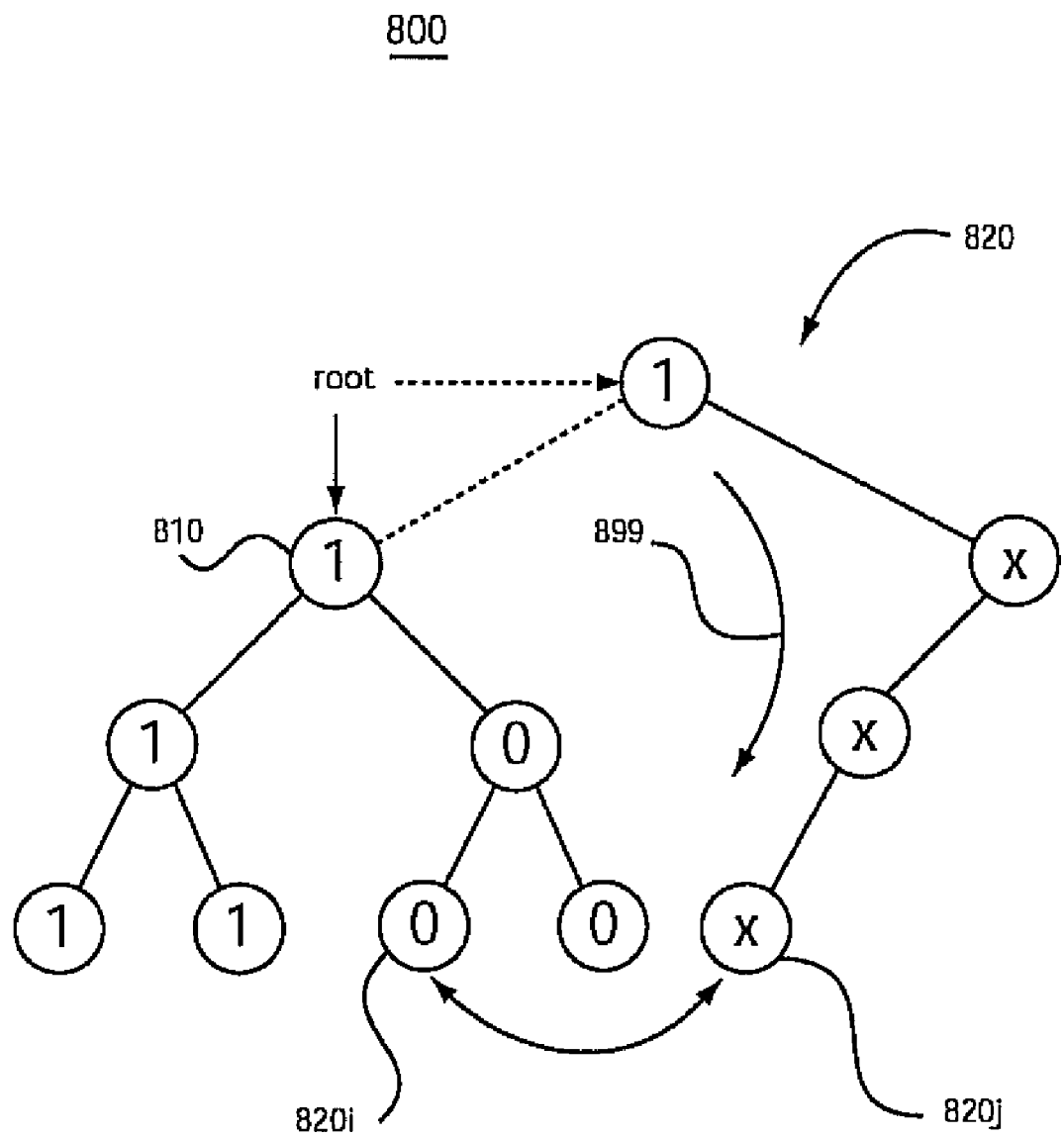
FIG. 8 is a diagram illustrating an example of growing and shrinking a tree 800 by adding/removing a root node 810.

Given a complete balanced binary tree, e.g., a single node, adding an additional leaf node is achieved by making the root of the existing tree the left child of a new root node and by adding a path of all left children from the right child new root to the bottom of the tree (FIG. 8). FIG. 8 is a diagram illustrating an example of growing and shrinking a tree 800 by adding/removing a root node 810. The tree includes leaf nodes 820. To remove an arbitrary leaf node 820i, it is swapped with the rightmost node 820j in the binary tree and the rightmost node is removed together with an eventual path 899 that does not lead to a leaf anymore. Using this scheme to grow and shrink the balanced tree, descriptions will be provided herein after regarding the aspects of concurrent operations.

Regarding growth of the tree, there are two different scenarios during the growth of the tree, namely adding a new child and adding a new root with a complete path. The implementation is described in terms of a linked data structure in memory.

Figure 9:
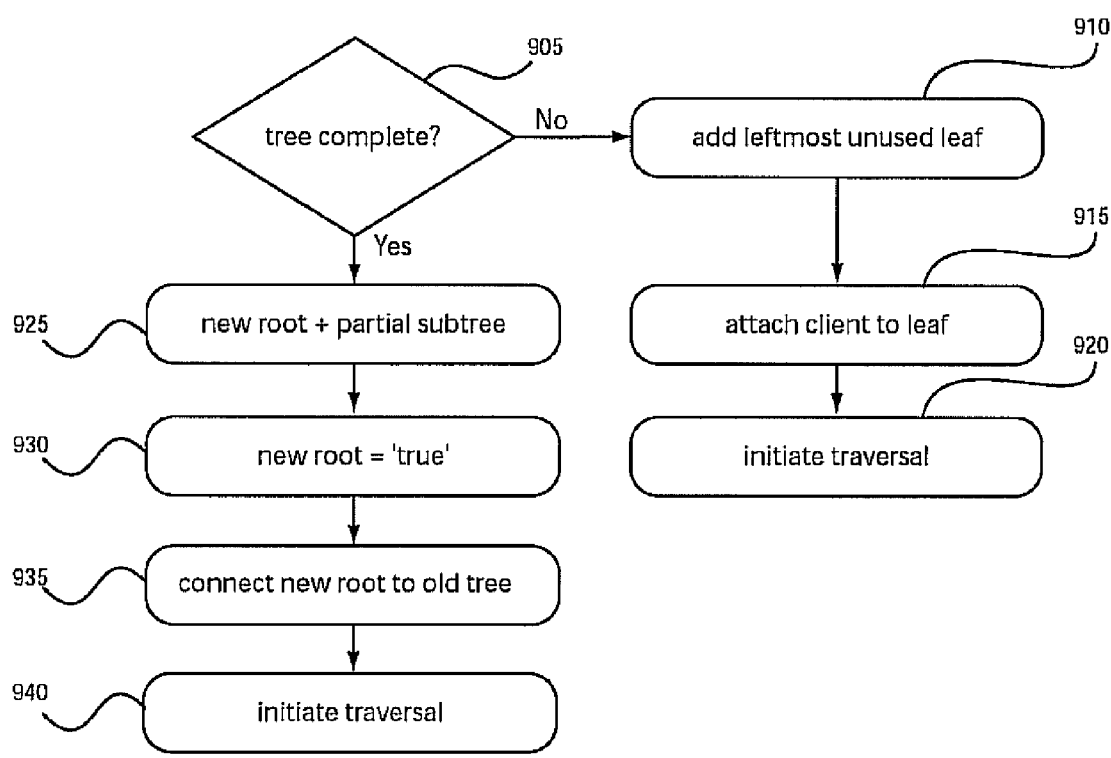
FIG. 9 is a flow chart of a method 900 for growing a compacting tree.
Figure 10:
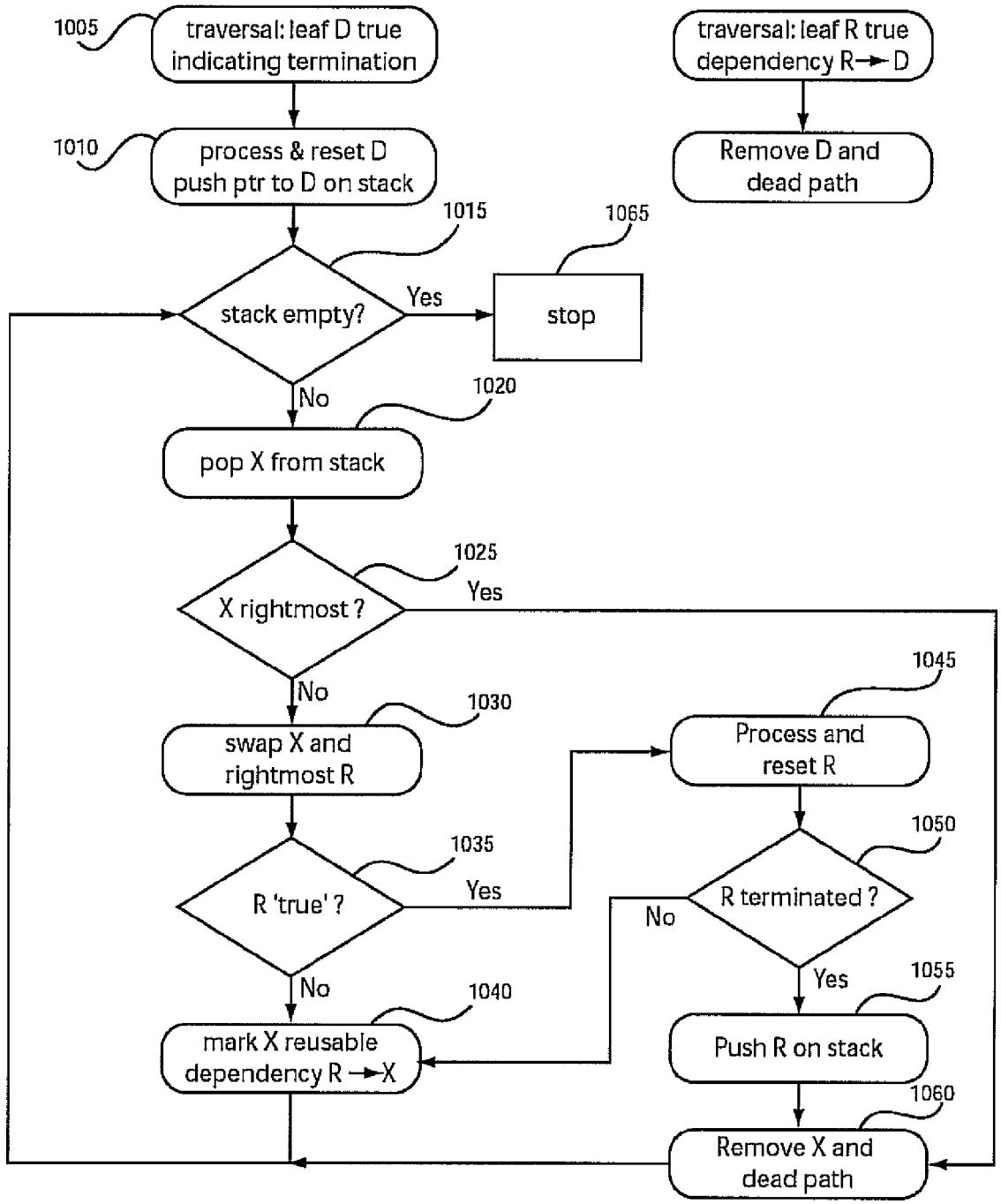
FIG. 10 is a flow diagram of a method 1000 for shrinking a compacting tree.

Each node includes three pointers, two for the children and one for the parent (FIG. 9). FIG. 9 is a flow chart of a method 900 for growing a compacting tree.

In FIG. 9, it is determined whether or not the tree is complete (step 905). If the tree is not complete, then the leftmost unused leaf is added (step 910). To add a new leaf node that does not require the addition of a new root node, the linked path including the leaf is created by recursively adding children (step 915). To add a child, a node is created and set to false. Its child pointers are set to zero and it is attached to the tree by setting its parent pointer and the appropriate child pointer of the parent. Once the bottom of the tree is reached, a producer may be attached to the leaf node that starts propagating signals. Thus, traversal is initiated (step 920). Since the alteration of the tree is completed before the submission of signals starts, no races are possible.

The more interesting part is the addition of a new root, since in this case sources are already propagating signals up the tree. First, the new path together with the new root node is created (step 925). The left child of the new root points to the old root. The new root is set to true (step 930) and the parent pointer of the old root is set to the new root (step 935). At this point, the new leaf node may begin to propagate signals. All signal propagations that reached the old root before the parent pointer was set stopped at the old root. The true new root causes a traversal that gathers these signals (step 940). All signal propagation started after the parent pointer of the old root was updated reach the new root and will be picked up latest by a following traversal. Again, an unnecessary traversal of the new root node may be initiated if there were no signal submissions during the alteration of the tree.

Regarding shrinking the tree, while the growth case was relatively simple, shrinking requires more thought. The critical part is to know when a parent node may be removed safely since multiple sources may include references. One important observation is that the leaf node (and ring buffer) of the thread does not reside in thread specific memory, thus the termination of the thread will not cause a race condition with modifications of the content of the leaf node. Thread specific memory includes only a pointer to the associated leaf node.

Before a source ceases to operate, it signals an event and adds a special information block to its queue that indicates its last transaction Once the sink processes this block, it lists the corresponding leaf node as inactive.

The consumer may safely swap any pair of leaf nodes as long as it marks the new paths of swapped sources to be true after the swap. There is a race condition between the alteration of the tree and a signal propagation of one of the involved threads. A thread may still finish a signal propagation although is leaf node was already moved. However, since the affected paths are set to true, no signal is lost. At most two surplus paths are investigated.

The inactive producer is swapped with the rightmost producer in the tree. This causes either a single leaf or a path to become "inactive". No part of this path can be removed, since the active partner of the swapped source may be in the process of propagating a signal.

The next traversal occurs in the sink right after the swap and insures that the moved active sources leaf node is reset to false, picking up an eventual signal. This concludes the swap operation.

The leaf node that "obtained" the inactive thread may be safely removed once the moved leaf of the active thread submits the first signal after the swap. This indicates that the moved producer picked up the new path. Since this thread is active, it has to produce at least its final signal indicating its termination. The remaining special case is that the termination signals propagation was disrupted by the swap. Then, the traversal that concludes the swap will find a second inactive node and that traversal also may remove the original initiator of the swap.

A moved leaf may become the rightmost node before it transmits its next signal. In this case, the removal of more than one path depends on its signaling. A simple lookup table includes all depending removals of a leaf node. Thus, upon the next true state of this node, the removals are detected in O(1) time.

Once both children of a node are removed, it may be safely removed itself.

Since an inactive leaf node may be safely reused, the peak storage of the signal tree is not increased by the delayed removal.

The adaptation of the tree with amortized cost of O(log(T)) per operation is possible, were T is the number of nodes present in the tree. Growth occurs instantaneously, shrinking is delayed. The delay can be avoided by initiating an (empty) signal propagation from the moved source.

Note that the computational overhead of an oversized tree is only logarithmic in the size of the tree, e.g., the depth of a tree with 256 nodes compared to a tree with 128 nodes increases only by less or equal than three. Furthermore, the storage requirement for a tree node is small.

As mentioned above, the entire protocol requires a timely correlation between entities in exactly one case. If there is a direct race between traversal and signal propagation in a single node v such that the write to false wins, it is necessary that the write to v's child u by the signal propagation becomes visible at the subsequent read by the traversal when it pulls u off the stack. For all other cases, it is sufficient if write operations by processor $P_1$ become visible "in order" to another processor $P_2$, the delay may be arbitrary.

A description will now be given regarding the scenario of a single source and multiple sinks.

In the case of a single source—multiple sink network, a single thread intends to broadcast an information package to a number of receiving threads. The protocol for this communication network is simpler than the reverse case. The data structure is referred to herein as a binary broadcasting tree.

The source is the root of the tree and the sinks are the nodes in the tree. Each sink with children transmits a copy of the information block to its children. Buffering capacity may be added through a ring buffer with Boolean handshakes in each node that is filled by the parent and read by the node itself.

The information flow is completely unidirectional and thus the operation of the tree does not involve any race conditions or inconsistencies. The elapsed time of a signal to reach all sinks is O(log(N)), the computation cost per participant is O(1).

Adaptation of the tree is again performed by a single task, e.g., the source. The balance of the binary tree is maintained in the same fashion as for the compacting tree. Some aspects of the tree modification are actually embedded into the signal stream, either by broadcast or by adding the capability of routed packages.

Embedded in a broadcast the elapsed time for an alteration is O(log(N)) and total CPU time O(N), the time per CPU is O(1). This presumes that each CPU is associated with a single node.

Routing packages specifically down the tree using a bit field for "transmit left/right" decisions requires the composition of the address in O(log(N)) time in the root and O(log(N)) total CPU time and elapsed time. That is, the amount of total work is less, but most of this work is concentrated in the root node.

Growth of the tree still involves the two cases, adding children and adding a new root (in this case without a path).

The step of adding a new root is implicitly synchronized with the signaling. The source attaches itself as parent of the new root and the old root becomes the left child of the new root. From this point, signals will reach the new node.

The step of adding a child is embedded into the signal stream. The signal instructs a specific node to add the attached new node as its left or right child. All subsequent information packages are copied to this child.

Shrinking of the tree involves two steps, a node has to signal its intent to stop and the source has to modify the tree.

The first of these steps is easily performed through a binary compacting tree, the second step is embedded in the data stream. The stopping node is replaced with the rightmost childless node. The stopping node may finish processing information, but not copying to its children.

The final removal of the inactive node occurs as follows: the parent of the stopping node obtains a signal to pick up a new child, the rightmost childless node; the parent of the rightmost node obtains a signal to drop its right or its left child, depending which node was chosen; the rightmost node obtains a signal to adopt to nodes, the children of the stopped node; and the stopped node obtains a signal that it may cease to copy information to its children.

Consider the data stream A, B, X, C, D, . . . , where X denotes the modification messages. Message B is still routed the old way. The parent of the stopping node writes C and so forth to the ring buffer of the rightmost node. The parent of the rightmost node stops copying to it after B. Thus, the data flow for this node is not interrupted.

The stopped node copies up to B to its children, after this it stops. The former rightmost node picks up copying the children with C. Thus, the data flow on all nodes is uninterrupted.

Note that the integrity of the data flow does not imply that all involved nodes see X at the same time. It is only important that the order of information down each path is maintained.

A description will now be given regarding hardware arbiters.

The implementation of a compacting tree as hardware logic provides a mechanism that serializes requests from multiple producers to a single consumer. If each combining node includes a number of combining trees, their connection to a larger tree creates an arbitration hierarchy.

There are two aspects of performance for serialization, latency and throughput. Latency is the time between the first submission of a set of concurrent requests to the first processing of a request. A measure for the throughput is the number of requests for disjoint resources that may be processed in parallel.

The compacting tree mechanism provides a latency that is logarithmic in the number of requesters. Under the assumption that the complete arbitration tree is implemented on a chip, the constant associated with the logarithm should be in the order of magnitude of a few clock cycles. It is likely that the communication between CPU and arbiter tree dominates the latency.

However, a single arbiter provides only a throughput of one request at a time. With a constant number of arbiters per producer and hashing of requests to arbiters based on the resource, e.g., a memory address, each arbiter handles on the average only requests for a small constant number of resources such that throughput in the average is proportional to the number of producers, e.g., CPUs.

Once arbiters are connected into an arbiter hierarchy, the connectivity becomes an issue. A chip is presumed to include 8 arbiters and to have 8 point-to-point connections (eventually bidirectional). The chip also includes 8 arbiter roots. The next generation may want to connect 8 such sub-trees to a 64-leaf tree, just passing on one "pin" for each arbiter root would require 64 inputs in the new root administration node, which is undesirable.

However, typically not all processors contend at the same time for all available resources. If all processors contend for one resource (address), then in each arbitration unit up to the root only one combining tree is used and having one pin per child and increasing the address space hashed to arbiters in each generation is sufficient.

Another likely scenario is that n disjoint groups of processors content for n different resources. The larger the number of groups, the more requests have to be handled in the root node in the worst case that groups are not included in sub-trees. However, the larger the number of groups, the less likely it is that they all look for different resources at exactly the same time, so that the practical impact on throughput is small.

These and other features and advantages of the invention may be readily ascertained by one of ordinary skill in the pertinent art based on the teachings herein. It is to be understood that the teachings of the invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the invention is not limited to those precise embodiments, and that various changes and modifications may be effected therein by one of ordinary skill in the pertinent art without departing from the scope or spirit of the invention. All such changes and modifications are intended to be included within the scope of the invention as set forth in the appended claims.

What is claimed is:

1. An apparatus for serializing concurrent requests to multiple processors of a computing device, comprising:

a signal merging tree structure having a root node and a plurality of leaf nodes for connecting a data consumer to the root node, the tree structure configured to serialize concurrent requests in the presence of race conditions, the tree structure farther configured to connect each of a plurality of request producers from among the multiple processors to a respective one of the plurality of leaf nodes; and a traversal mechanism configured to enable a request producer to transmit a signal from a leaf node corresponding to the request producer to the data consumer at the root node by setting all nodes on a path from the leaf node to the root node to a Boolean value true, the traversal mechanism farther configured to enable the data consumer to trace signal submissions of the plurality of request producers such that submission traversals by the plurality of request producers and trace traversals by the data consumer can be concurrently performed to allow the occurrence of data races between signal submissions by any of the plurality of request producers and between signal submissions by any of the plurality of request producers and the data consumer.

2. The apparatus of claim 1, wherein the tree is a balanced binary tree.

3. The apparatus of claim 1, wherein the plurality of data produces is a dynamic set that allows for adding and removing one of more data producers from the dynamic set.

4. The apparatus of claim 1, wherein the root node and each of the plurality of leaf nodes includes a respective Boolean value.

5. The apparatus of claim 4, wherein the respective Boolean value of the root node and each of the plurality of leaf nodes is initially set to a Boolean false.

6. The apparatus of claim 4, wherein the respective Boolean value is adapted for use as a handshake on an associated buffer such that the data consumer is capable of reading the associated buffer when the respective Boolean value is true and each of the plurality of data producers is capable of writing to the associated buffer when the respective Boolean value is false.

7. The apparatus of claim 1, further comprising a ring buffer having a plurality of entries, each of the plurality of entries having a Boolean variable that indicates ownership by one of the data consumer and a data producer from among the plurality of data producers.

8. The apparatus of claim 1, wherein said signal merging tree structure, in response to a modification request, is capable of adding at least one new leaf node, deleting at least one of the plurality of leaf nodes already existing, and replacing the root node already existing.

9. The apparatus of claim 1, wherein the root node and the plurality of leaf nodes are linked together by pointers, and said signal merging free structure adds a new leaf to the tree by recursively adding child nodes, creating a new path together with a new root node, designating the root node prior to the new root node as an old root node, setting a Boolean value of the new root node to true and a parent pointer of the old root node is set to the new root node, so tat the new root node causes a traversal through the tree that gathers all signal propagations that previously reached the old root node prior to the setting of the parent pointer that previously stopped at the old root node.

10. The apparatus of claim 1, wherein the tree is arranged such that left child nodes and right child nodes of any node from among the root and each of the plurality of leaf nodes are equivalent with respect to order.

11. The apparatus of claim 1, further comprising a stack, and wherein said traversal mechanism enables the data consumer to traverse the path in depth first order by popping a node onto the stack from among the root node and the plurality of leaf nodes, setting a Boolean value of the popped node to false when the Boolean value is determined to be true, processing leaf information of the popped node when the popped node is childless, and pushing any child nodes of the popped node onto the stack when the popped node is not childless, and repeating the setting, the processing, and the pushing for each of the encountered nodes.

12. The apparatus of claim 11, wherein the leaf information is processed by at least recording a signal transmitted from a corresponding data producer associated with the node.

13. The apparatus of claim 1, wherein said traversal mechanism traverses the path in the tree in response to the data producer intending to transmit the signal.

14. A method for serializing concurrent requests to multiple processors of a computing device, comprising:
configuring a signal merging tree structure having a root node and a plurality of leaf nodes for connecting a data consumer to the root node, the signal merging tree structure for serializing concurrent requests in the presence of race conditions;
connecting each of a plurality of request producers from among the multiple processors to a respective one of the plurality of leaf nodes; and
enabling a request producer to transmit a signal from a leaf node corresponding to the request producer to the data consumer at the root node by setting all nodes on a path from the leaf node to the root node to a Boolean value true;
enabling the data consumer to trace signal submissions of the plurality of request producers such that submission traversals by the plurality of request producers and trace traversals by the data consumer can be concurrently performed to allow the occurrence of data races between signal submissions by any of the plurality of request producers and between signal submissions by any of the plurality of request producers and the data consumer.

15. The method of claim 14, wherein the tree is a balanced binary tree.

16. The method of claim 14, wherein the plurality of data produces is a dynamic set that allows for adding and removing one of more data producers from the dynamic set.

17. The method of claim 14, wherein the root node and each of the plurality of leaf nodes includes a respective Boolean value.

18. The method of claim 17, wherein the respective Boolean value is adapted for use as a handshake on an associated buffer such that the data consumer is capable of reading the associated buffer when the respective Boolean value is true and each of the plurality of data producers is capable of writing to the associated buffer when the respective Boolean value is false.

19. The method of claim 14, wherein the tree is arranged such that left child nodes and right child nodes of any node from among the root and each of the plurality of leaf nodes are equivalent with respect to order.

20. The method of claim 14, wherein said traversal mechanism traverses the path in the tree in response to the data producer intending to transmit the signal.

* * * * *